United States Patent [19]
Heintzelman

[11] Patent Number: 5,229,795
[45] Date of Patent: Jul. 20, 1993

[54] EYEGLASS FRAMES ADAPTED TO HANG FLAT AGAINST A WEARER'S CHEST

[76] Inventor: E. Earl Heintzelman, 6524 Blue Ridge, Cincinnati, Ohio 45213

[21] Appl. No.: 796,089

[22] Filed: Nov. 20, 1991

[51] Int. Cl.$^5$ .............................................. G02C 5/14
[52] U.S. Cl. .................................. 351/120; 351/115; 351/119; 2/450
[58] Field of Search ............... 351/120, 115, 119, 156; 2/450

[56] References Cited

U.S. PATENT DOCUMENTS

| | | |
|---|---|---|
| 771,067 | 9/1904 | Heeren . |
| 1,083,702 | 1/1914 | Persohn . |
| 1,252,126 | 1/1918 | Letzeisen .............................. 351/120 |
| 2,107,102 | 2/1938 | Catron, Jr. . |
| 2,829,558 | 4/1958 | Ratti . |
| 3,060,804 | 10/1962 | Rogers . |
| 3,189,912 | 6/1965 | Miller . |
| 3,271,094 | 9/1966 | Wildermuth . |
| 3,422,449 | 1/1969 | Rinnman . |
| 3,476,466 | 11/1969 | Hopkins . |
| 3,841,741 | 10/1974 | Vischer, Jr. . |
| 3,846,018 | 11/1974 | Gerson . |
| 3,907,410 | 9/1975 | Richmond et al. . |
| 3,947,100 | 3/1976 | Vischer, Jr. . |
| 4,017,165 | 4/1977 | Davis . |
| 4,029,403 | 6/1977 | Harris . |
| 4,129,362 | 12/1978 | Lorenzo . |
| 4,448,502 | 5/1984 | Tota . |
| 4,547,048 | 10/1985 | Negishi . |
| 4,986,650 | 1/1991 | Wilhelmi . |
| 4,991,952 | 2/1991 | Grau . |

FOREIGN PATENT DOCUMENTS 1286780  1/1969  Fed. Rep. of Germany .

Primary Examiner—Bruce Y. Arnold
Assistant Examiner—Hung Xuan Dang

[57] ABSTRACT

A pair of eyeglass frames having double action articulating hinges which allow the eyeglass frames to be folded into a substantially flat configuration for suspension about a wearer's neck and against a wearer's chest. The temple pieces are rotatable inwardly and downwardly about substantially vertical and horizontal axes respectively to assume their "hang flat" configuration.

5 Claims, 2 Drawing Sheets

EYEGLASS FRAMES ADAPTED TO HANG FLAT AGAINST A WEARER'S CHEST

FIELD OF THE INVENTION

This invention relates to eyeglass frames, and more particularly to a pair of eyeglass frames adapted to be folded into a compact configuration and suspended from a neck chain or cord when not in use.

BACKGROUND OF THE INVENTION

It has been common for many years to use a neck chain or neck cord fastened at its opposite ends to the temple members of a pair of eyeglasses in order that the eyeglasses could be suspended or hung about the wearer's neck when the eyeglasses were not in use. This simple device enabled those who wore glasses on a part-time basis to maintain their glasses readily available, and without actually storing them in an eyeglasses case within a pocket, purse or briefcase. This device also enabled wearers of sunglasses to simply remove them when the wearer stepped inside from out of doors without the need for permanently storing them, such that when the user returned to the outdoors the user might merely grasp the sunglasses hanging on the user's chest and place them back on.

However, this well known scheme of maintaining a pair of eyeglasses or sunglasses readily at hand by suspending same about the neck on a chain or cord has several drawbacks. For example, when the ends of the neck chain or cord are attached near the rearward ends of the temple pieces of the eyeglass frames, as is most commonly done, the eyeglass frames assume a rather bulky non-compact configuration when hanging against a user's chest. Specifically, the eyeglasses remain completely unfolded, as they would normally appear while being worn. This creates an unwanted bulge in the profile of a person, substantially equal to the height of the front frame portion of the eyeglass frames. Therefore, the eyeglass frames cannot readily be stored underneath a coat, sweater or vest, and if so concealed therein the result is a rather visible and unsightly garment bulge.

Also, oftentimes a user may lean up against a desk or the like and inadvertently damage or crush the eyeglass lenses or the frames themselves against the edge of a desk, the wearer not being accustomed to the two or so inches of additional profile against the chest.

Further, hugging of friends and loved ones and the like similarly can result in damaged frames and/or lenses and discomfort to both parties.

Another disadvantage of traditional glasses being suspended about a wearer's neck is that the upturned frames with horizontally disposed lenses therein tend to accumulate crumbs and the like while the wearer is dining. This is especially objectionable should fluids, such as gravy, coffee, etc., be spilled on the lenses.

SUMMARY OF THE INVENTION

It has therefore been an objective of the present invention to devise a pair of eyeglass frames which may be used in conjunction with a neck cord or chain to be worn about a wearer's neck and suspended against a wearer's chest, but which result in a much flatter or compact configuration against the wearer's chest.

It has been another objective of the present invention to provide a pair of eyeglass frames which, when suspended from a neck chain or cord and worn against the chest of a user, may be stored beneath a coat, sweater or vest with little or no visible evidence of garment bulge.

It has been yet another objective of the present invention to provide a pair of eyeglass frames which when suspended about a wearer's neck with a chain or cord the lenses of which do not serve to accumulate crumbs, debris and the like.

Still another objective of the present invention has been to provide a pair of eyeglass frames which are continuously adjustable to allow for tilting of the lenses for more comfortable reading and the like.

In accordance with the stated objectives, the present invention is a pair of eyeglass frames comprising a frame adapted to receive a pair of eyeglass lenses and to be worn on a person's nose, and having two sides thereon; and a pair of temple pieces each of which is pivotally connected to one of the sides of the frame with an articulating joint which is operable to allow each temple piece to rotate inwardly about a first axis between an outer position substantially perpendicular to a plane defined by the frame and an inner position substantially parallel to the plane defined by the frame, and to allow each temple piece to rotate downwardly approximately 80°-100° about a second axis which is substantially perpendicular to the first axis between an upper position and a lower position. This allows the eyeglass frames to assume a substantially flat configuration upon full rotation of the temple pieces about both axes, such that the glasses frames hang substantially flat against a wearer's chest when worn about the neck of the wearer with a neck chain or cord.

Each articulating joint comprises a first hinge tab fixedly secured to the side of the frame structure and a second hinge tab rotatably secured to a forward end of the temple piece, the temple piece thereby being rotatable with respect to the second hinge tab about the second axis. The first hinge tab is of course hingably connected to the second hinge tab such that the first and second hinge tabs are thereby rotatable with respect to each other about the first axis.

To allow the temple pieces to easily rotate about the second axis, the rearwardmost end of the second hinge tab is generally semi-circular, and a portion of the forward end of the temple piece against which the second hinge tab is secured is machined away or otherwise recessed by an amount approximately equal to the thickness of the hinge tab.

A portion of the forward end of the temple piece directly or immediately below the second hinge tab is slightly raised above the recessed portion to provide a positioning stop for the temple piece.

One advantage of the present invention is that a pair of eyeglass frames has been provided which will lie substantially flat against the use 's chest when worn suspended from the user's neck with a neck cord or chain.

Another advantage of the present invention is that the lenses of a pair of eyeglasses so worn will not serve as collectors of crumbs, debris and the like.

Yet another advantage of the present invention is that the eyeglasses may be continuously adjusted to allow for tilting of the lenses.

Still another advantage of the present invention is that the eyeglasses may be worn beneath garments without an unsightly bulge therein.

Still another advantage of the present invention is that the eyeglasses are less susceptible to breakage at the connection between the front frame and the temple pieces due to the double action hinging articulation.

These and other objects and advantages of the present invention will become more readily apparent during the following detailed description taken in conjunction with the accompanying drawings herein, in which:

DESCRIPTION OF THE PREFERRED EMBODIMENTS

Figure 1:
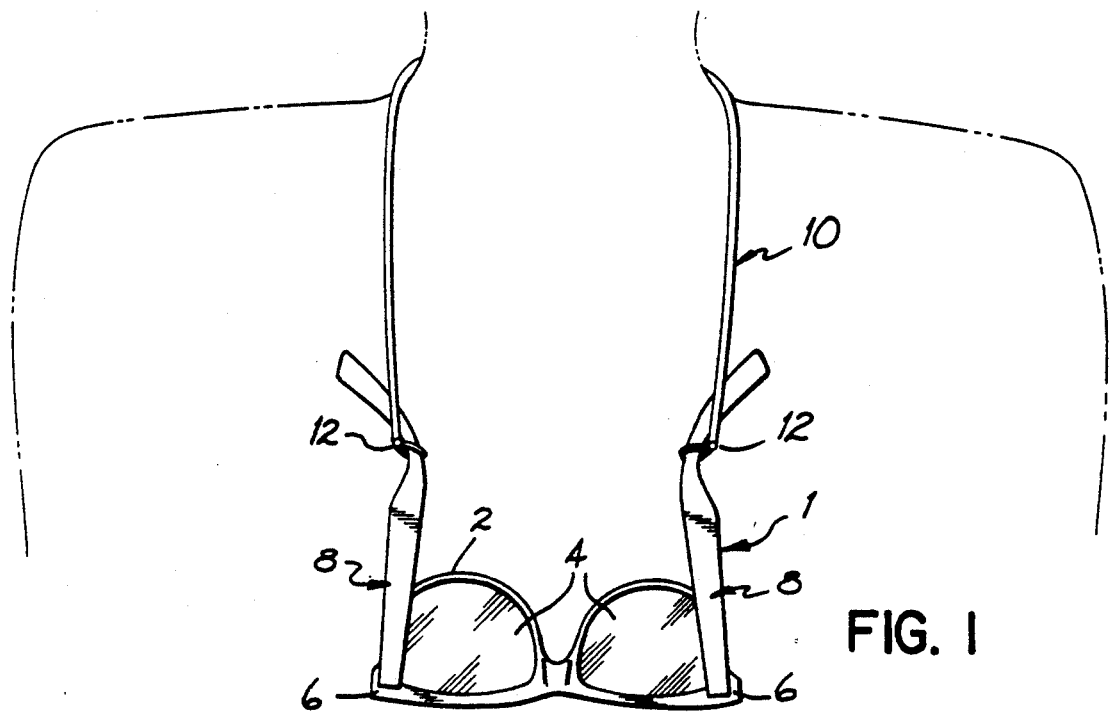
FIG. 1 is a frontal view of the eyeglasses to the present invention worn in the compact folded configuration suspended about a wearer's neck with a neck cord.
Figure 2:
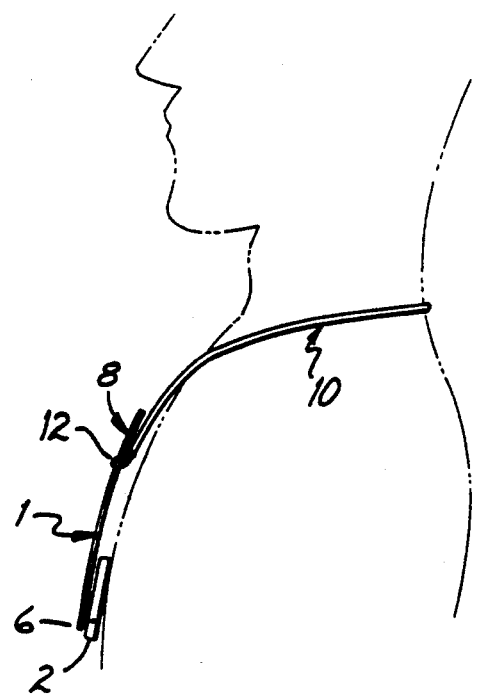
FIG. 2 is a view similar to FIG. 1 but taken from a side illustrating the compact configuration of the eyeglasses of the present invention and their ability to "hang flat" against a wearer's chest.

With reference to FIG. 1, there is illustrated a pair of eyeglass frames 1 in accordance with the present invention. It will be appreciated by those skilled in the art that the present invention can also be practiced with sunglass frames as well as safety glass frames; therefore the invention is not limited to eyeglass frames but same are used only for illustrative purposes. Therefore as used herein the term "eyeglasses" includes "sunglasses" and "safety glasses". The eyeglass frames 1 comprise generally a front frame structure 2 adapted to receive a pair of eyeglass lenses 4, 4 and adapted to be worn on a person's nose, and having two sides or corners 6, 6 thereon. Connected to each side or corner 6 of the frame 2 is a temple piece 8. Connected to the rearwardmost end of each temple piece 8 is the end 12 of a neck chain or cord 10. The eyeglass frames in FIG. 1 are illustrated in the "hang flat" mode or configuration wherein the temple pieces 8, 8 are rotated (which will be described subsequently in detail) against the frame 2. FIG. 2 illustrates the profile of a wearer of the eyeglass frames 1 of the present invention with the eyeglass frames in their "hang flat" mode or configuration.

Figure 3:
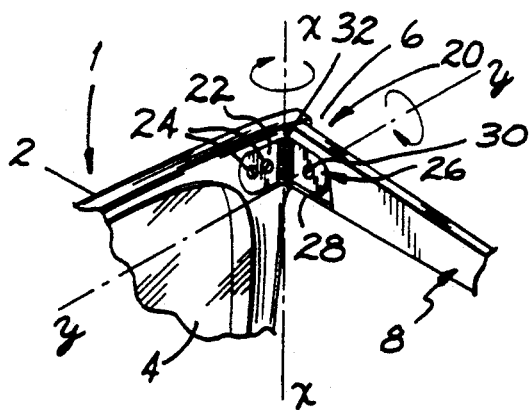
FIG. 3 is a perspective view of the double action articulating hinge of the present invention illustrating the temple piece in the fully unfolded configuration.

Referring now to FIG. 3, there is illustrated the double action articulating joint 20 of the present invention. The double action articulating joint 20 comprises a first hinge tab 22 fixedly secured to the side 6 of the frame structure 2 with two screws or rivets 24, 24, and a second hinge tab 26 rotatably secured to a forward end 28 of the temple piece 8 with a single screw or rivet 30. The hinge tabs 22 and 26 are hingably secured together by way of a hinge pin or screw 32. It will be appreciated that the joint 20 in fact has two axes of rotation, the first axis being axis XX which allows the temple piece 8 to rotate inwardly between an outer position substantially perpendicular to a plane defined by the frame 2 and an inner position substantially parallel to the plane defined by the frame 2, and a second axis YY which is substantially perpendicular to the axis XX and which allows the temple piece 8 to rotate downwardly approximately 80°-100° between an upper position and a lower position.

Figure 3A:
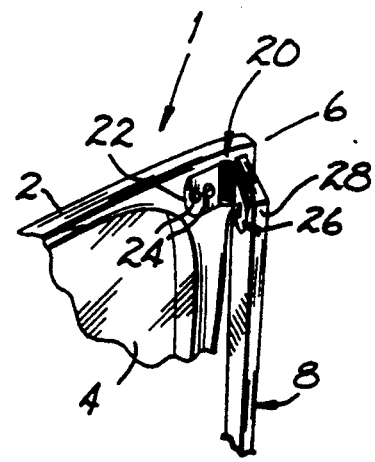
FIG. 3A is a view similar to FIG. 3 illustrating the temple piece beginning to be folded about both the XX and YY axes.
Figure 4:
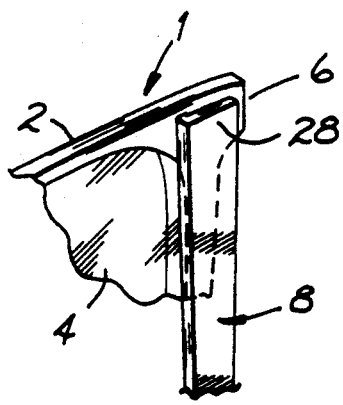
FIG. 4 is a view similar to FIG. 3A but illustrating the temple piece completely folded about the XX and YY axes into a compact configuration.

With reference to FIGS. 3, 3A and 4, in sequence, it will be seen that the temple pieces 8, 8 of the eyeglass frames 1 may be folded from the fully open configuration 3 to their fully folded compact "hang flat" configuration of FIG. 4 by simply rotating each temple piece 8 in seriatim or simultaneously about the axes XX and YY.

Figure 6:
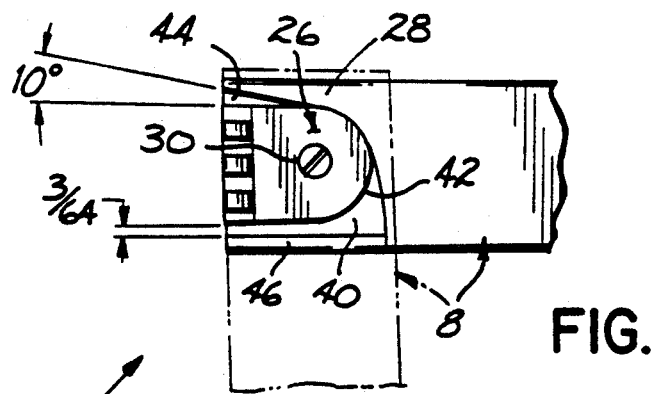
FIG. 6 is an enlarged view of the forward end of the temple piece with hinge tab mounted thereto and illustrating the recessed and raised portions thereof.
Figure 5:
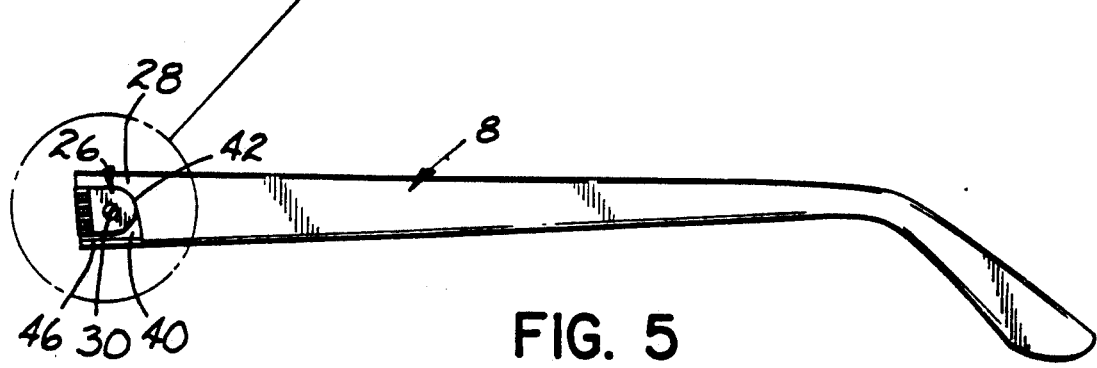
FIG. 5 is a side view of a temple piece illustrating the temple piece hinge tab.

With reference now to FIGS. 5 and 6, there is illustrated the temple piece 8 with the second hinge tab 26 pivotally secured thereto. With reference to FIG. 6 the hinge tab 26 connected to the forward end 28 of the temple piece 8 is most clearly seen in enlarged form. In this enlarged figure, it will be seen that a portion of the forward end 28 of the temple piece 8 is recessed or otherwise machined away in the area 40 against which the hinge tab 26 is secured. This recessed portion 40 is preferably recessed to a depth approximately equal to the thickness dimension of the hinge tab 26, and in conjunction with the semi-circular rearwardmost end 42 of the hinge tab 26 provides for smooth yet firm rotation of the temple piece 8 in a downward direction. The recessed portion 40 is relieved at area 44 at the uppermost and forwardmost edge of the hinge tab 26 by an amount approximately equal to 10°, to provide for adjustability. Immediately below the hinge tab 26 there is a raised portion 46 which is raised slightly above the recessed portion and which acts as a positioning stop for the temple piece 8. Preferably, there is a space approximately equal to 3/64" between the lower edge of the temple piece 8 and the beginning of the raised portion 46 to also provide for adjustability.

The front frame 2, temple piece 8 and double acting joint 20 are all designed such that the temple pieces may rotate inwardly approximately 80°-100°, and downwardly approximately 80°-100°; although these rotational ranges can be selected as desired. The raised portion 46 provides for firm yet smooth rotation of the temple piece 8 as the raised portion 46 is rotated upwardly and beneath the hinge tab 26. When the temple piece is rotated back to the normal position, the hinge tab 26 "snaps" down off of the raised portion 46, the raised portion 46 thereby serving as a stop or limiting device.

In use, the eyeglass frames of the present invention are used just as normal eyeglasses are used. The double action articulation of the eyeglass frames of the present invention allow for the eyeglass frames to resist damage and breakage at the temple piece/front frame piece juncture which is normally associated with standard eyeglass frames. Further, the eyeglasses are continuously adjustable in that the lenses may be tilted downwardly for reading, etc., the effect being that the lenses may be centered with a wearer's line of vision to reduce fatigue, neck bending, etc. And, the sides of the frames may be adjusted up or down to avoid the objectionable and seemingly proverbial "tilted glasses" effect common to traditional frames.

Those skilled in the art will recognize numerous adaptations and modifications which can be made to the eyeglass frames of the present invention and which will result in an improved set of eyeglass frames, yet all of which will be encompassed within the spirit and scope of the invention, as defined in the claims. For example, the first hinge tab 22 could be rotatably secured to the frame 2, and the second hinge tab 26 could be fixedly secured to the forward end 28 of the temple piece 8. Or, a ball and socket type joint could be employed in the connection of the temple pieces to the front frame structure. Accordingly, I intend to be limited only by the scope of the claims.

What is claimed is:

1. A pair of eyeglass frames comprising:
   a frame adapted to receive a pair of eyeglass lenses and to be worn on a person's nose, and having two sides thereon;
   a pair of temple pieces each of which is pivotally connected to one of said sides of said frame with articulating joint means;
   said articulating joint means being operable to allow each said temple piece to rotate inwardly about a first axis between an outer position substantially perpendicular to a plane defined by said frame and an inner position substantially parallel to said plane defined by said frame, and to allow each said temple piece to rotate downwardly approximately 80°-90° about a second axis which is substantially perpendicular to said first axis;
   whereupon full rotation of said temple pieces about both said axes places said eyeglass frames into a substantially flat configuration.

2. A pair of eyeglass frames comprising:
   a frame adapted to receive a pair of eyeglass lenses and to be worn on a person's nose, and having two sides thereon;
   a pair of temple pieces each of which is pivotally connected to one of said sides of said frame with articulating joint means;
   said articulating joint means being operable to allow each said temple piece to rotate inwardly about a first axis between an outer position substantially perpendicular to a plane defined by said frame and an inner position substantially parallel to said plane defined by said frame, and to allow each said temple piece to rotate downwardly approximately 80°-90° about a second axis which is substantially perpendicular to said first axis;
   said articulating joint means comprising:
   a first hinge tab fixedly secured to said side of said frame structure;
   a second hinge tab rotatably secured to a forward end of said template piece, said temple piece thereby being rotatable with respect to said second hinge tab about said second axis;
   said first hinge tab being hingably connected to said second hinge tab, said first and second hinge tabs thereby being rotatable with respect to each other about said first axis;
   whereupon full rotation of said temple pieces about both said axes places said eyeglass frames into a substantially flat configuration.

3. The pair of eyeglass frames of claim 2 wherein a rearwardmost end of said second hinge tab is generally semi-circular.

4. The pair of eyeglass frames of claim 3 wherein a portion of said forward end of said temple piece against which said second hinge tab is secured is recessed by an amount approximately equal to a thickness dimension of said second hinge tab.

5. The pair of eyeglass frames of claim 4 wherein a portion of said forward end of said temple piece below said second hinge tab is raised slightly above said recessed portion.

* * * * *